UNITED STATES PATENT OFFICE.

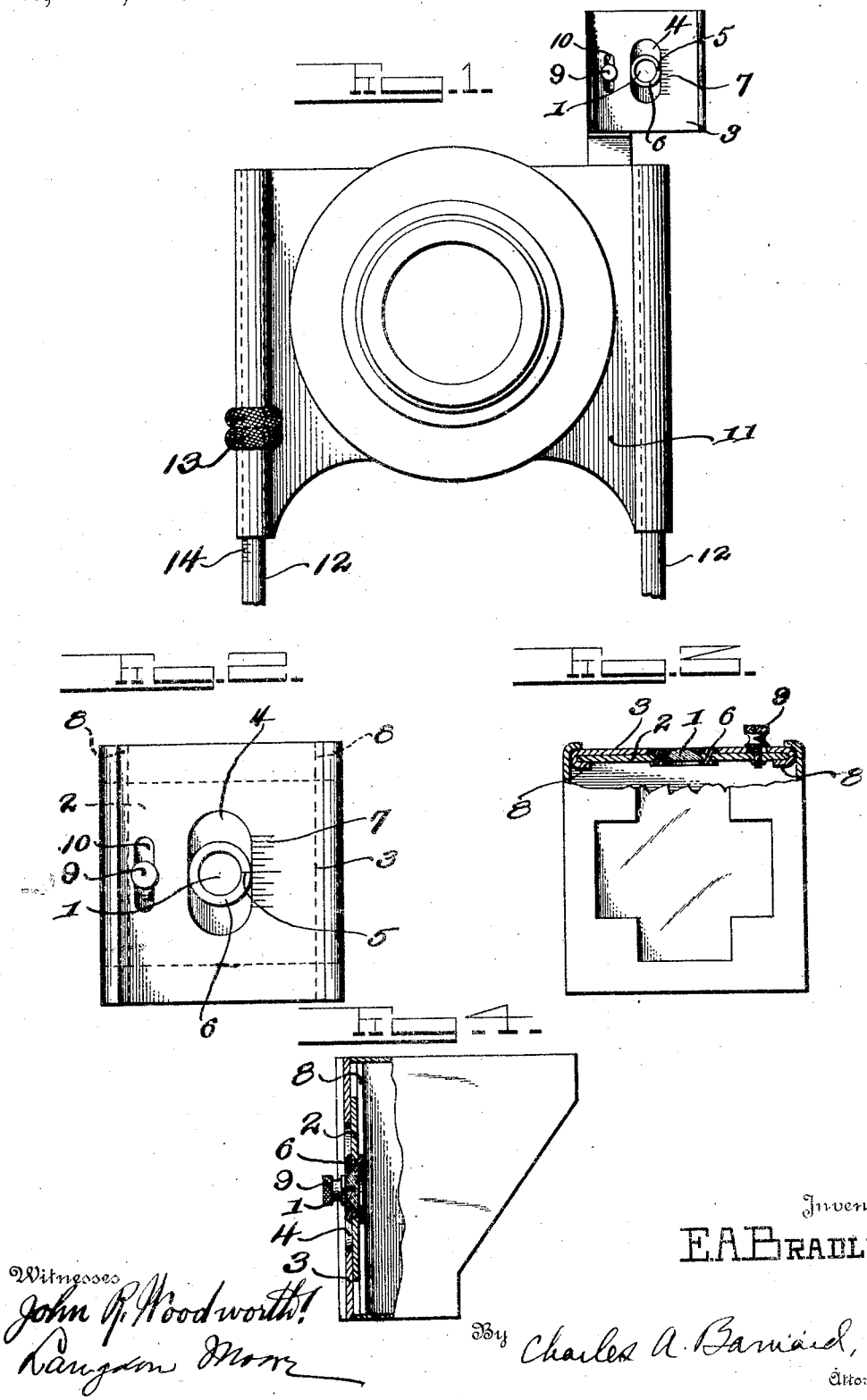

EUGENE A. BRADLEY, OF GEORGETOWN, KENTUCKY.

CAMERA VIEW-FINDER.

1,151,157.

Specification of Letters Patent.   Patented Aug. 24, 1915.

Application filed January 12, 1915. Serial No. 2,065.

*To all whom it may concern:*

Be it known that I, EUGENE A. BRADLEY, a citizen of the United States, residing at Georgetown, in the county of Scott and State of Kentucky, have invented new and useful Improvements in Camera View-Finders, of which the following is a specification.

This invention relates to improvements in camera view finders and more particularly to a camera view finder.

Most portable cameras are provided with view finders and particularly a view finder is necessary in the roll film camera. In such cameras the view finder is mounted upon either a fixed or movable part of the camera frame or upon the camera lens frame. The lens carrying frame or front is usually mounted for vertical adjustment so that while the surface of the plate or film remains vertical, the vertical adjustment of the lens will include in the photograph points above or below the usual view without disturbing the focus or vertical position of the plate or film. In roll film cameras the vertical adjustment of lens front is the matter of conjecture.

It is the object of this invention to construct a view finder for a portable camera which can be adjusted independently of the camera lens front to indicate the exact amount of adjustment of the lens front to include such points as appear upon the ground glass of the adjusted finder.

While the preferred form of this invention is illustrated upon the accompanying sheet of drawing yet it is to be understood that minor detail changes may be made without departing from the scope thereof.

Figure 1 represents, in front elevation, a conventional form of a vertically adjustable lens carrying front, with parts broken away, and supporting thereon a view finder in accordance with this invention. Fig. 2 is an enlarged detail view in front elevation of this improved view finder. Fig. 3 is a top plan view of Fig. 2, with parts shown in section. Fig. 4 is a view in side elevation of Fig. 2 with parts shown in section.

In carrying out this invention the lens 1 of the view finder is carried upon a plate 2 mounted to slide vertically upon the front 3 of the finder and the front is provided with an elongated central vertical opening or slot 4 through which the rays of light through the lens may travel. An indicator 5 is provided at one side of the center of the lens support 6 and the adjacent edge of the finder front opening is provided with a scale 7, having a zero or other mark to indicate the central or normal position of the finder lens. The finder lens plate 2 may be mounted in any preferred manner upon the finder front. Figs. 3 and 4 illustrate the side edges of the finder front turned in upon themselves to form plate guides 8. The plate 2 may be secured after adjustment in any manner, however, it is preferable to provide a set screw 9 carrying upon the plate 2 passing through an elongated vertical slot 10 as on one side of the central finder opening, said set screw having a portion adapted to engage the finder front to clamp the plate thereto in an adjusted position.

Fig. 1 illustrates conventional form of vertically adjustable camera lens frame or front in which the lens frame 11 is mounted to slide upon two vertical posts 12. Movement may be imparted to the lens frame by a knurled nut 13 mounted upon one of the posts. A scale 14 is provided upon one of the posts of such relation to the view finder scale that the movement of the camera lens frame through one division thereof will cause the same relative change between the camera lens and film as between the finder lens and finder glass upon movement of the finder lens through one division of the finder scale.

It is to be understood that the finder may be located at any desirable portion upon the camera and it is not limited to the position illustrated on Fig. 1 nor is the particular form of vertical adjustment of the camera lens front limited to the form illustrated, as long as the relation of adjustment of the lens front and the finder front may be constant, for the purpose set forth.

What I claim is:—

1. A camera view finder comprising a finder frame, having an elongated slot provided in the front thereof, a finder lens, a movable member mounting said lens adapted for movement with the lens traveling between the sides of the slots.

2. A camera view finder comprising a finder frame, having an elongated vertical slot provided in the front thereof, a finder lens, a plate carrying the lens mounted for moving the lens in line with the slot, a scale upon the finder frame, and means for securing the lens in adjustable position.

3. A camera view finder comprising a finder frame, having an elongated central vertical slot provided in the front thereof, a finder lens, a plate carrying the lens mounted for vertical movement with the lens in line with the slot, a scale upon the finder frame, the front at one side of the first slot having a second elongated slot provided therein, and a set screw carried upon the plate passing through said second slot and adapted to engage the front to hold the lens in adjusted position.

EUGENE A. BRADLEY.

Witnesses:
 J. C. NICHOLS,
 W. E. BROWNING.